(12) United States Patent
Chung et al.

(10) Patent No.: US 11,206,361 B2
(45) Date of Patent: Dec. 21, 2021

(54) PIXEL SENSOR, CONTROL METHOD THEREOF AND DETECTOR

(71) Applicants: Beijing BOE Sensor Technology Co., Ltd., Beijing (CN); BOE TECHNOLOGY GROUP CO., LTD., Beijing (CN)

(72) Inventors: Kunjing Chung, Beijing (CN); Xuecheng Hou, Beijing (CN)

(73) Assignees: BEIJING BOE SENSOR TECHNOLOGY CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 88 days.

(21) Appl. No.: 16/824,976

(22) Filed: Mar. 20, 2020

(65) Prior Publication Data

US 2021/0152726 A1 May 20, 2021

(30) Foreign Application Priority Data

Nov. 15, 2019 (CN) .......................... 201911118737.2

(51) Int. Cl.
*H04N 5/335* (2011.01)
*H04N 5/235* (2006.01)
*H04N 5/345* (2011.01)

(52) U.S. Cl.
CPC ......... *H04N 5/2355* (2013.01); *H04N 5/2351* (2013.01); *H04N 5/3452* (2013.01)

(58) Field of Classification Search
CPC .. H04N 5/2355; H04N 5/2351; H04N 5/3452; H04N 5/3698; H04N 5/32; H04N 5/376; G01T 1/2018; G01T 1/20; G01T 1/20185; G01T 1/2023; G01T 1/20186; G01T 1/20184
See application file for complete search history.

(56) References Cited

U.S. PATENT DOCUMENTS

| | | | |
|---|---|---|---|
| 2004/0174449 A1* | 9/2004 | Lee ........................ | H04N 5/374 348/308 |
| 2020/0124748 A1* | 4/2020 | Hofrichter ............ | G01T 1/2018 |
| 2020/0124749 A1* | 4/2020 | Takenaka ................. | G01T 1/20 |
| 2021/0136304 A1* | 5/2021 | Siaud ................... | H04N 5/3415 |

* cited by examiner

*Primary Examiner* — Kelly L Jerabek
(74) *Attorney, Agent, or Firm* — Calfee, Halter & Griswold LLP

(57) ABSTRACT

The present disclosure relates to a pixel sensor, a control method thereof, and a detector. The pixel sensor includes a photoelectric conversion circuit, an energy storage circuit, a reset circuit, a first switch circuit, and a second switch circuit; wherein, the energy storage circuit is connected to the photoelectric conversion circuit, and the photoelectric conversion circuit is further connected to a second power supply; a control end of the reset circuit is connected to a second scanning signal end; the first switch circuit is connected between the first power supply and a first node, and a control end thereof is connected to the first end of the energy storage circuit; second switch circuit is connected between the first node and a signal output end, and a control end thereof is connected to a first scanning signal end.

20 Claims, 7 Drawing Sheets

PIXEL SENSOR, CONTROL METHOD THEREOF AND DETECTOR

CROSS-REFERENCE TO RELATED APPLICATION

This application claims priority to Chinese Patent Application No. 201911118737.2, filed on Nov. 15, 2019, the contents of which are incorporated by reference in the entirety.

TECHNICAL FIELD

The present disclosure relates to the field of display technology, and in particular, to a pixel sensor, a control method thereof, and a detector.

BACKGROUND

With the development and progress of technology, X-ray detectors have been widely used in medical and industrial flaw detection and other fields. Commonly used X-ray detectors are indirect flat-panel detectors. X-rays are converted into visible light by a scintillator during use. The visible light is converted into data signals by a pixel sensor, thereby driving a display device to display the detection result.

At present, when a pixel sensor is used, it needs to input multiple signals and the timings corresponding to the multiple signals. For example, scanning signals, reset signals, power signals and their corresponding timings.

It should be noted that the information disclosed in the Background section above is only used to enhance the understanding of the background of the present disclosure, and therefore may include information that does not constitute the prior art known to those of ordinary skill in the art.

SUMMARY

The present disclosure is to provide a pixel sensor, a control method thereof, and a detector.

According to a first aspect of the present disclosure, a pixel sensor is provided. The pixel sensor includes:

a photoelectric conversion circuit, configured to convert an optical signal into an electrical signal;

an energy storage circuit, having a first end connected to a first end of the photoelectric conversion circuit, and a second end connected to a second end of the photoelectric conversion circuit, wherein the second end of the photoelectric conversion circuit is further connected to a second power supply end;

a reset circuit, having a first end connected to a first power supply end, a second end connected to the photoelectric conversion circuit and a control end connected to a second scanning signal end, and the reset circuit being configured to be turned on in response to a second scanning signal of the second scanning signal end to transmit a first power signal to the first end of the energy storage circuit;

a first switch circuit, having a first end connected to the first power supply end, a second end connected to a first node, and a control end connected to the first end of the energy storage circuit, and the first switch circuit being configured to be turned on in response to a signal stored in the energy storage circuit to transmit the first power signal to the first node;

a second switch circuit, having a first end connected to the first node, a second end connected to a signal output end, and a control end connected to a first scanning signal end, and the second switch circuit being configured to be turned on in response to a first scanning signal of the first scanning signal end to transmit a signal at the first node to the signal output end.

According to an embodiment of the present disclosure, the pixel sensor further includes:

a first delay circuit, disposed between the second scanning signal end and the control end of the reset circuit, and configured to delay turn-off of the reset circuit.

According to an embodiment of the present disclosure, the first delay circuit includes:

a first resistance-capacitance circuit, wherein the first resistance-capacitance circuit is respectively connected to the second scanning signal end, the control end of the reset circuit, and a third power supply end.

According to an embodiment of the present disclosure, the first delay circuit includes:

a first diode, having a first end connected to the second scanning signal end, and a second end connected to the control end of the reset circuit;

a second diode, having a first end connected to the control end of the reset circuit, and a second end connected to the second scanning signal end.

According to an embodiment of the present disclosure, the pixel sensor further includes:

a second delay circuit, wherein the second delay circuit is provided between the first power supply end and the first end of the reset circuit.

According to an embodiment of the present disclosure, the second delay circuit includes:

a second resistance-capacitance circuit, wherein the second resistance-capacitance circuit is connected to the first power supply end, the first end of the reset circuit, and a third power supply end, respectively.

According to an embodiment of the present disclosure, the first switch circuit includes:

a first transistor, having a first end connected to the first power supply end, a second end connected to the first node and a control end connected to the first end of the energy storage circuit, and the first transistor being configured to be turned on in response to the signal stored in the energy storage circuit to transmit the first power signal to the first node.

According to an embodiment of the present disclosure, the second switch circuit includes:

a second transistor, having a first end connected to the first node, a second end connected to the signal output end, and a control end connected to the first scanning signal end, and the second transistor being configured to be turned on in response to the first scanning signal to transmit the signal at the first node to the signal output end.

According to an embodiment of the present disclosure, the photoelectric conversion circuit includes:

a photodiode, having a first end connected to the control end of the first switch circuit and a second end connected to the second power supply end.

According to an embodiment of the present disclosure, the reset circuit includes:

a third transistor, having a first end connected to the photoelectric conversion circuit, a second end connected to the first power supply end, and a control end connected to the second scanning signal end, and the third transistor being configured to be turned on in response to the second scanning signal to transmit the first power signal to the first end of the energy storage circuit.

According to a second aspect of the present disclosure, there is provided a method for controlling a pixel sensor, the method including:

converting an optical signal into an electrical signal and storing the electrical signal in an energy storage circuit;

turning on a first switch circuit and a second switch circuit and turning off a reset circuit to transmit an amplified electrical signal to a signal output end, by using the electrical signal, a first scanning signal, and a second scanning signal;

turning off the second switch circuit and turn on the reset circuit to reset the energy storage circuit by using the first scanning signal and the second scanning signal.

According to a third aspect of the present disclosure, there is provided a detector including the above-mentioned pixel sensor.

It should be understood that the above general description and the following detailed description are merely exemplary and explanatory, and should not limit the present disclosure.

BRIEF DESCRIPTION OF THE DRAWINGS

The above and other features and advantages of the present disclosure will become more apparent by describing its example embodiments in detail with reference to the drawings.

DETAILED DESCRIPTION

Figure 1:
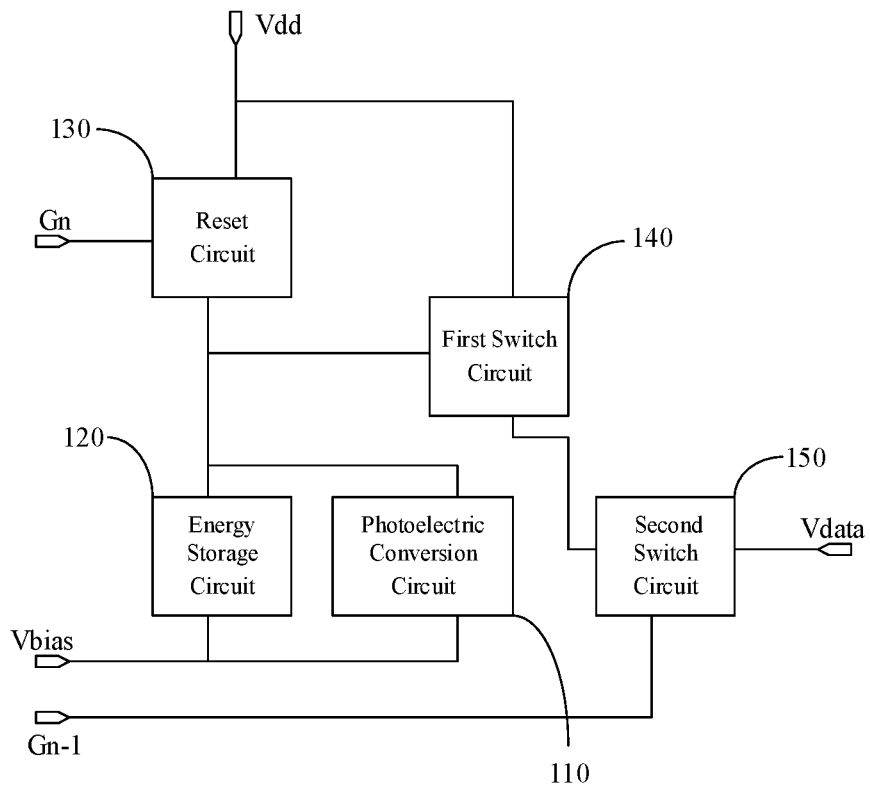
FIG. 1 is a schematic block diagram of a first pixel sensor according to an exemplary embodiment of the present disclosure.

Example embodiments will now be described more fully with reference to the accompanying drawings. However, example embodiments can be implemented in various forms and should not be construed as limited to the embodiments set forth herein; rather, these embodiments are provided so that this disclosure will be thorough and complete, and will fully convey the concept of example embodiments to those skilled in the art. The same reference numerals in the drawings denote the same or similar parts, and their repeated description will be omitted.

Furthermore, the described features, structures, or characteristics may be combined in any suitable manner in one or more embodiments. In the following description, many specific details are provided to give a full understanding of the embodiments of the present disclosure. However, those skilled in the art will realize that the technical solutions of the present disclosure may be practiced without one or more of the specific details, or other methods, components, materials, devices, steps, etc. may be adopted. In other instances, well-known structures, methods, devices, implementations, materials, or operations have not been shown or described in detail to avoid obscuring aspects of the present disclosure.

The block diagrams shown in the drawings are merely functional entities and do not necessarily correspond to physically separate entities. That is, these functional entities may be implemented in the form of software, or these functional entities or part may be implemented in one or more software-hardened modules, or these functional entities may be implemented in different networks and/or processor devices and/or microcontroller devices.

An exemplary embodiment of the present disclosure provides a pixel sensor. As shown in FIG. 1, the pixel sensor includes a photoelectric conversion circuit 110, an energy storage circuit 120, a reset circuit 130, a first switch circuit 140, and a second switch circuit 150; the photoelectric conversion circuit 110 is configured to convert an optical signal into an electrical signal. A first end of the energy storage circuit 120 is connected to a first end of the photoelectric conversion circuit 110, a second end of the energy storage circuit 120 is connected to a second end of the photoelectric conversion circuit 110, and the second end of the photoelectric conversion circuit 110 is further connected to an end of a second power supply Vbias. A first end of the reset circuit 130 is connected to an end of a first power supply Vdd, a second end of the reset circuit 130 is connected to the photoelectric conversion circuit 110, a control end of the reset circuit 130 is connected to an end of a second scanning signal Gn, and the reset circuit 130 is turned on in response to the end of the second scanning signal Gn to transmit a signal of the end of the first power supply Vdd to the first end of the energy storage circuit 120. A first end of the first switch circuit 140 is connected to the end of the first power supply Vdd, a second end of the first switch circuit 140 is connected to a first node, and a control end of the first switch circuit 140 is connected to the first end of the energy storage circuit 120. The first switch circuit 140 is turned on in response to a signal stored in the energy storage circuit 120 to transmit a signal of the first power supply Vdd to the first node. A first end of the second switch circuit 150 is connected to the first node, a second end of the second switch circuit 150 is connected to a signal output end, and a control end of the second switch circuit 150 is connected to an end of a first scanning signal Gn−1. The second switch circuit 150 is turned on in response to the first scanning signal Gn−1 to transmit a signal at the first node to the signal output end.

The pixel sensor provided in the embodiment of the present disclosure converts the optical signal into the electrical signal through the photoelectric conversion circuit 110, stores the electrical signal in the energy storage circuit 120, and transmits the signal of the first power supply Vdd to the signal output end through the first switch circuit 140 and the second switch circuit 150 by using the electrical signal and the first scanning signal Gn−1, so as to amplify the electrical signal output by the photoelectric conversion circuit 110. The energy storage circuit 120 is reset by the second scanning signal Gn, and the scanning signal of the next line is multiplexed to reset the pixel sensor, which reduces the number of signals and signal lines in the pixel sensor, simplifies the control of the pixel sensor, and is beneficial to saving wiring space of the pixel sensor. In addition, the reset circuit is controlled by the second scanning signal Gn, so that the detector can be reset line by line, reducing the current during reset, and reducing the ripple impact of excessive current on the first power supply during reset.

Figure 2:
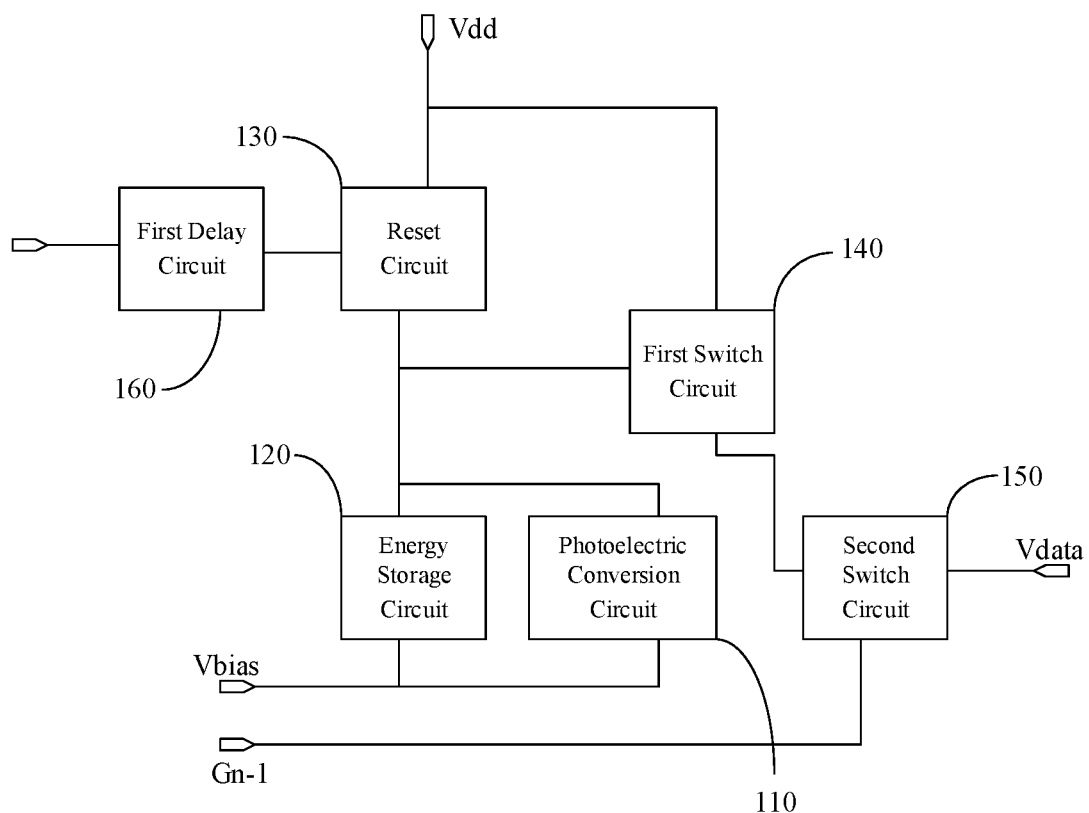
FIG. 2 is a schematic block diagram of a second pixel sensor provided by an exemplary embodiment of the present disclosure.

Further, in a feasible implementation manner, as shown in FIG. 2, the pixel sensor provided in the embodiment of the present disclosure further includes a first delay circuit 160, and the first delay circuit 160 is provided between the end of the second scanning signal Gn and a control end of the reset circuit 130 for delaying the turn-off of the reset circuit 130. Since the second scanning signal Gn needs to simultaneously reset the second switch circuit 150 of next row and the reset circuit 130 of previous row during the reset process, and the reset circuit 130 of the previous row may affect the first power supply Vdd input by the first switch circuit 140 of the next row, noise is further generated. The turn-off of the reset circuit 130 can be delayed by the first delay circuit 160 to reduce its ripple noise to the first power supply Vdd.

Figure 3:
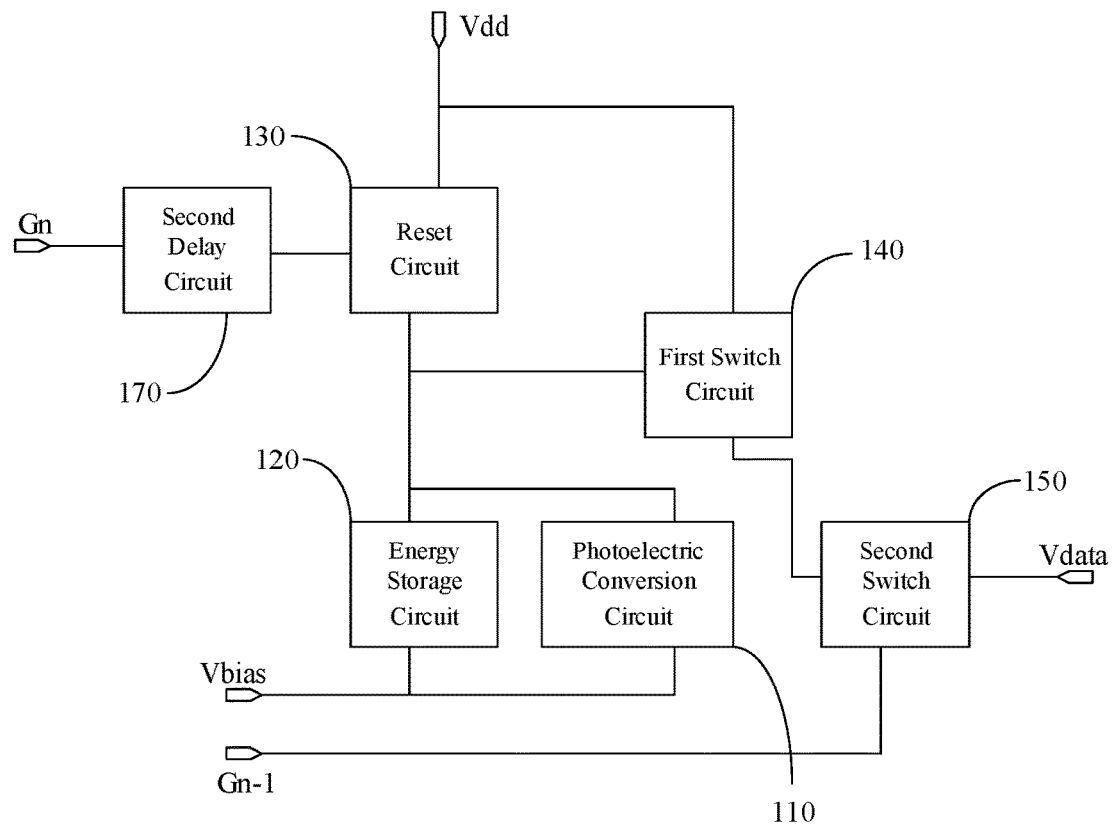
FIG. 3 is a schematic block diagram of a third pixel sensor provided by an exemplary embodiment of the present disclosure.

In another feasible implementation manner, as shown in FIG. 3, the pixel sensor provided in the embodiment of the present disclosure further includes a second delay circuit 170, wherein the second delay circuit 170 is provided between the end of the first power supply Vdd and the first end of the reset circuit 130, and is configured to delay the turn-off of the reset circuit 130. Since the second scanning signal Gn needs to simultaneously reset the second switch circuit 150 of the next row and the reset circuit 130 of the previous row during the reset process, and the reset circuit 130 of the previous row will affect the first power Vdd input by the first switch circuit 140 of the next row, the noise is further generated, and the turn-off of the reset circuit 130 can be delayed by the second delay circuit 170 to reduce its ripple noise to the first power supply Vdd.

Figure 4:
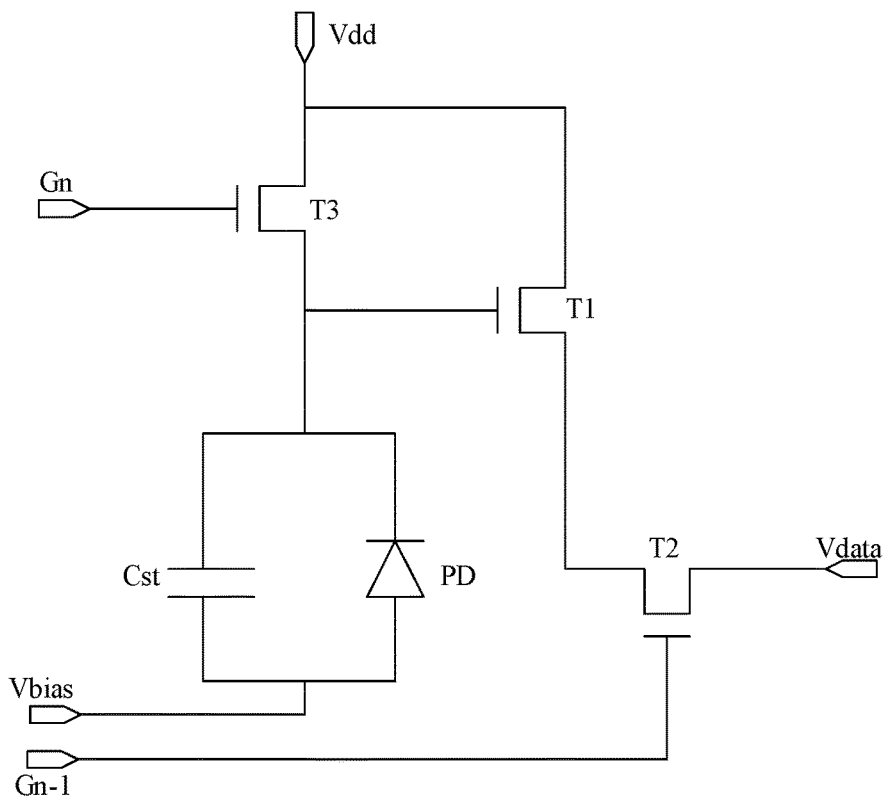
FIG. 4 is a circuit diagram of a first pixel sensor provided by an exemplary embodiment of the present disclosure.

The circuits of the pixel sensor provided in the embodiments of the present disclosure will be described in detail below:

As shown in FIG. 4, the first switch circuit 140 includes a first transistor T1, wherein, a first end of the first transistor T1 is connected to the first power supply Vdd, a second end of the first transistor T1 is connected to the first node, and a control end of the first transistor T1 is connected to the first end of the energy storage circuit 120. The first transistor T1 is turned on in response to a signal stored in the energy storage circuit 120 to transmit the signal of the first power Vdd to the first node.

The second switch circuit 150 includes a second transistor T2, wherein, a first end of the second transistor T2 is connected to the first node, a second end of the second transistor T2 is connected to a signal output end, and a control end of the second transistor T2 is connected to the first node, the second transistor T2 is turned on in response to the first scanning signal Gn−1 to transmit the signal at the first node to the signal output end.

The photoelectric conversion circuit 110 includes a photodiode PD, wherein, a first end of the photodiode PD is connected to the control end of the first switch circuit 140, and a second end of the photodiode PD is connected to the second power supply Vbias. In an X-ray detector, the X-ray is irradiated into a detector and firstly passes through a scintillator, which function is to convert the X-ray into visible light, and then the visible light is incident on a glass back plate, and the photodiode PD receives the visible light to excite electrons to the energy storage capacitor Cst for storage.

The reset circuit 130 includes a third transistor T3, wherein, a first end of the third transistor T3 is connected to the photoelectric conversion circuit 110, a second end of the third transistor T3 is connected to the first power supply Vdd, and a control end of the third transistor T3 is connected to the second scanning signal Gn. The third transistor T3 are turned on in response to the second scanning signal Gn to transmit the signal of the first power supply Vdd to the first end of the energy storage circuit 120.

The energy storage circuit 120 includes an energy storage capacitor Cst, wherein, a first end of the energy storage capacitor Cst is connected to the first end of the photodiode PD, and a second end of the energy storage capacitor Cst is connected to the second end of the photodiode PD. The photodiode PD is excited after receiving the optical signal, and stores the electrical signal in the energy storage capacitor Cst.

Figure 5:
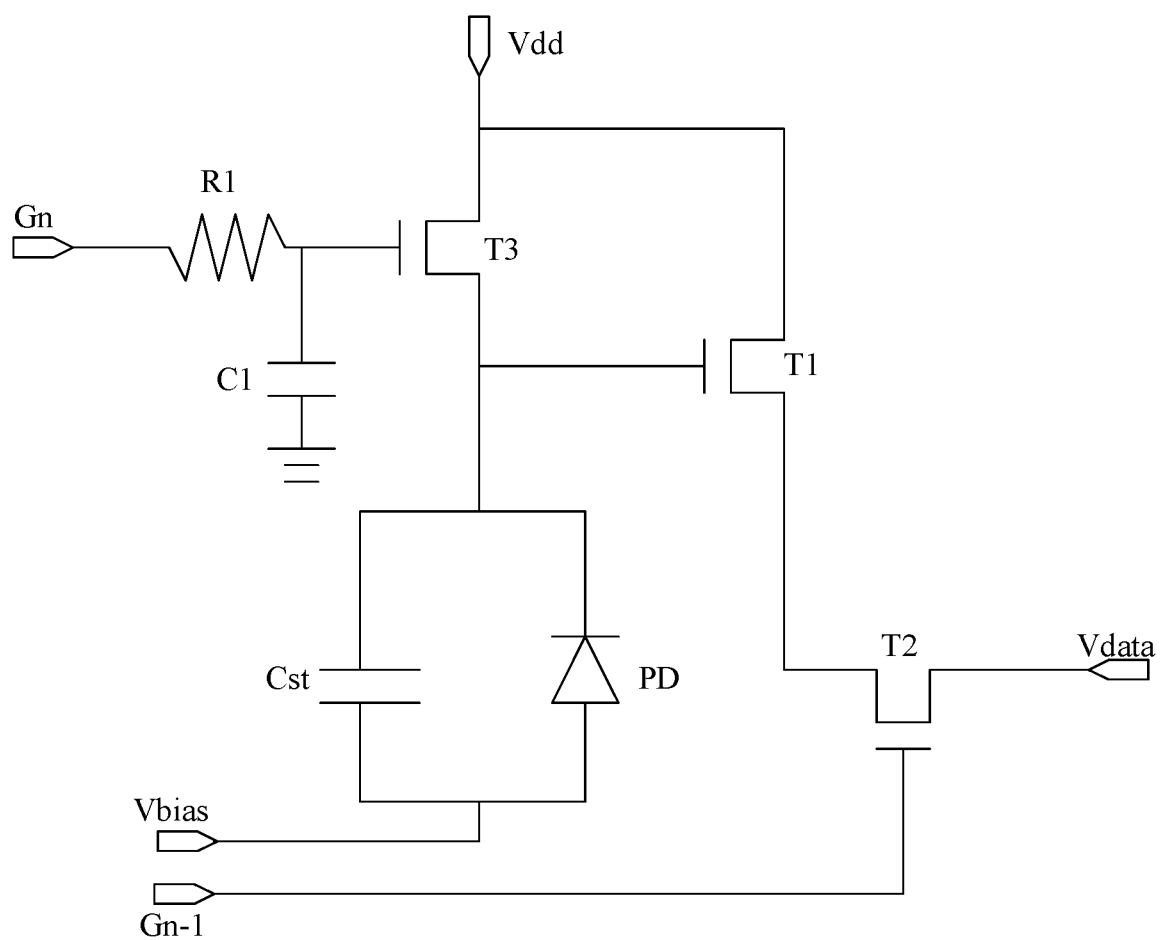
FIG. 5 is a circuit diagram of a second pixel sensor provided by an exemplary embodiment of the present disclosure.

In a feasible implementation manner, as shown in FIG. 5, the first delay circuit 160 includes a first resistor-capacitor circuit, wherein the first resistor-capacitor circuit is connected to the end of the second scanning signal Gn, the control end of the reset end circuit 130 is and an end of the third power supply.

The first resistor-capacitor circuit includes a first capacitor C1 and a first resistor R1, wherein, a first end of the first resistor R1 is connected to the end of the second scanning signal Gn, and a second end of the first resistor R1 is connected to the control end of the third transistor T3; a first end of the first capacitor C1 is connected to the control end of the third transistor T3, a second end of the first capacitor C1 is connected to the end of the third power supply, and the end of the third power supply may be a ground end. The signal of the control end of the third transistor T3 is delayed by the first resistance-capacitance circuit, thereby reducing the ripple effect on the first power supply Vdd when the third transistor T3 is turned on.

Figure 6:
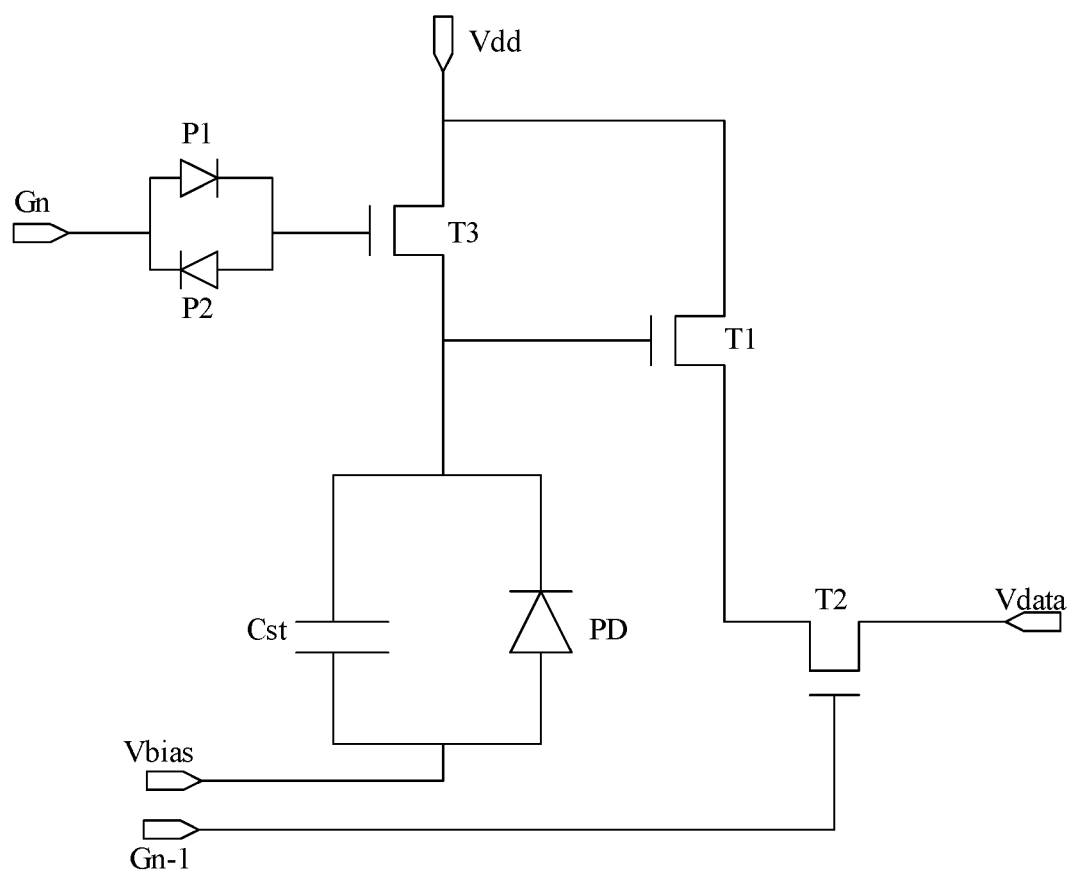
FIG. 6 is a circuit diagram of a third pixel sensor provided by an exemplary embodiment of the present disclosure.

In another feasible implementation manner, as shown in FIG. 6, the first delay circuit 160 includes a first diode P1 and a second diode P2, wherein, a first end of the first diode P1 is connected to the end of the second scanning signal Gn, and a second end of the first diode P1 is connected to the control end of the reset circuit 130; a first end of the second diode P2 is connected to the control end of the reset circuit 130, and a second end of the second diode P2 is connected to the end of the second scanning signal Gn. The signal of the control end of the third transistor T3 is delayed by a dual-diode circuit, thereby reducing the ripple effect on the first power supply Vdd when the third transistor T3 is turned on.

Figure 7:
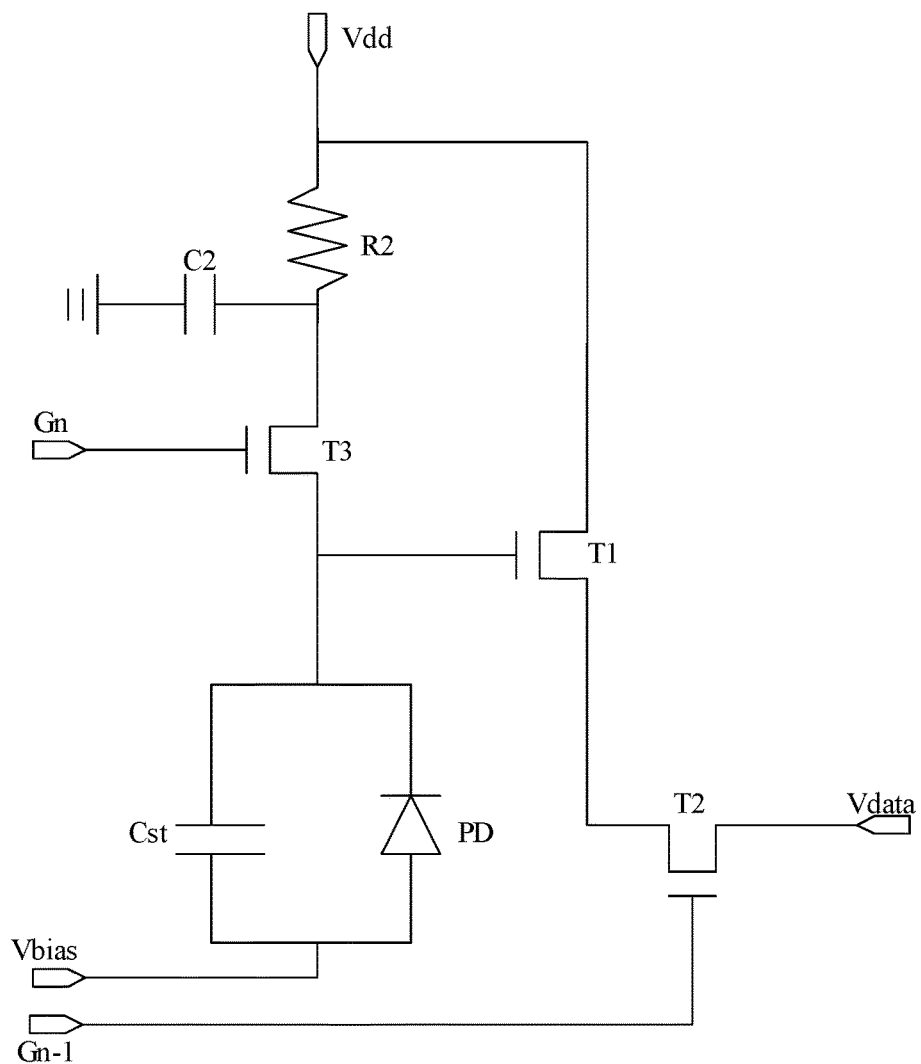
FIG. 7 is a circuit diagram of a fourth pixel sensor provided by an exemplary embodiment of the present disclosure.

As shown in FIG. 7, the second delay circuit 170 includes a second resistor-capacitor circuit, wherein, the second resistor-capacitor circuit is respectively connected to the end of the first power supply Vdd, the first end of the reset circuit 130 and the end of the third power supply. The second resistor-capacitor circuit includes a second capacitor C2 and a second resistor R2, wherein, a first end of the second resistor R2 is connected to the end of the first power supply Vdd and a second end of the second resistor R2 is connected to the first end of the third transistor T3; a first end of the first capacitor C1 is connected to the first end of the third transistor T3, a second end of the first capacitor C1 is connected to the end of the third power supply, and the end of the third power may be a ground end. The signal of the first end of the third transistor T3 is delayed by the second resistor-capacitor circuit, thereby reducing the ripple effect on the first power supply Vdd when the third transistor T3 is turned on.

In this exemplary embodiment, each transistor has a control end, a first end, and a second end. Specifically, the control end of each transistor may be a gate, the first end may be a source, and the second end may be a drain; or, the control end of each transistor may be a gate, the first end may be a drain, and the second end may be a source. In addition, each transistor may further be an enhancement transistor or a depletion transistor, which is not specifically limited in this exemplary embodiment.

On this basis, all transistors can be N-type thin film transistors, and the driving voltage of each transistor is a high-level voltage. Alternatively, all the transistors may be P-type thin film transistors, and the driving voltage of each transistor is a low-level voltage.

Figure 8:
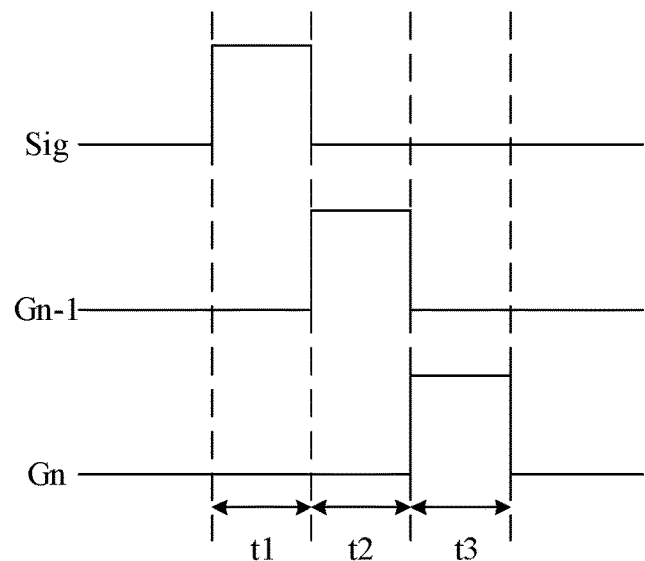
FIG. 8 is a control timing diagram of a first pixel sensor provided by an exemplary embodiment of the present disclosure.

For example, all transistors are N-type transistors, the signal of the first power supply Vdd is a high-level signal, and the signal of the third power supply is a ground signal. The working process of the pixel sensor will be described in detail with reference to a working timing diagram of a pixel driving circuit shown in FIG. 8, wherein, the first scanning signal Gn−1 is adjacent to the second scanning signal Gn, and the first scanning signal Gn−1 is earlier than the second scanning signal Gn. The signal of the control end of the reset circuit is provided by the second scanning signal Gn, that is, the current line is reset when the next line is scanned.

During a time period t1 (that is, a signal acquisition phase): the first scanning signal Gn−1 is low level and the second transistor T2 is turned off; the second scanning signal Gn is low level and the third transistor T3 is turned off; the photodiode PD receives an optical signal and converts the optical signal into an electrical signal Sig and stores it in the energy storage capacitor Cst.

During a time period t2 (that is, a signal output phase): the first scanning signal Gn−1 is high level and the second transistor T2 is turned on; the second scanning signal Gn is low level and the third transistor T3 is turned off; the first transistor T1 is turned on under the driving of the signal in the energy storage capacitor Cst, and the signal of the first power supply Vdd is transmitted to the signal output end through the first transistor T1 and the second transistor T2, that is, the amplified electrical signal is transmitted to the signal output end.

During a time period t3 (that is, a reset phase): the first scanning signal Gn−1 is low level, and the second transistor T2 is turned off; the second scanning signal Gn is high level, and the third transistor T3 is turned on; the first power supply Vdd and the second power supply Vbias are respectively loaded on both ends of the energy storage capacitor Cst, and the energy storage capacitor Cst is reset.

It should be noted that in the above specific embodiments, all transistors are N-type transistors; however, those skilled in the art can easily obtain pixel sensors in which all transistors are P-type transistors according to the pixel sensors provided by the present disclosure. In an exemplary embodiment of the present disclosure, all transistors may be P-type transistors, and the use of all P-type thin film transistors has the following advantages: for example, it has a strong ability to suppress noise; for example, low level is easy to implement in charge management due to low level turn-on; for example, P-type thin film transistors have simple manufacturing processes and relatively low prices; for example, P-type thin film transistors have better stability and so on. Of course, the pixel sensor provided in the present disclosure may further be changed to a CMOS (Complementary Metal Oxide Semiconductor) circuit, etc., and is not limited to the pixel sensor provided in this embodiment, which is not repeated here.

The pixel sensor provided by the embodiment of the present disclosure converts an optical signal into an electrical signal through the photoelectric conversion circuit 110, stores the electrical signal in the energy storage capacitor Cst, and transmits a first power signal Vdd to a signal output end through a first switch circuit 140 and a second switch circuit 150 by using the electrical signal and a first scanning signal Gn−1 to realize amplification of the electrical signal output by the photoelectric conversion circuit 110. The energy storage capacitor Cst is reset by a second scanning signal Gn, and a scanning signal of next line is multiplexed to reset the pixel sensor, thereby reducing a number of signals and signal lines in the pixel sensor, simplifying control of the pixel sensor and helping to save wiring space of the pixel sensor.

The pixel sensor provided in the embodiments of the present disclosure enables a backplane to be compatible with active detectors and passive detectors, which can effectively reduce the difficulty of detector development and increase the versatility of products. In addition, the pixel sensor requires fewer control signals and timing, which reduces the circuit complexity and shortens the development schedule.

The pixel sensor is reset line by line through the scanning signal, which can disperse the large current during reset and reduce the ripple impact on the first power supply Vdd, thereby improving the stability of the amplifier circuit and reducing external noise interference. In addition, the amplifier stage circuit can be initialized at a first time to reduce the current of the amplifier stage circuit from interfering with the read signals of other pixels, thereby effectively improving crosstalk.

Figure 9:
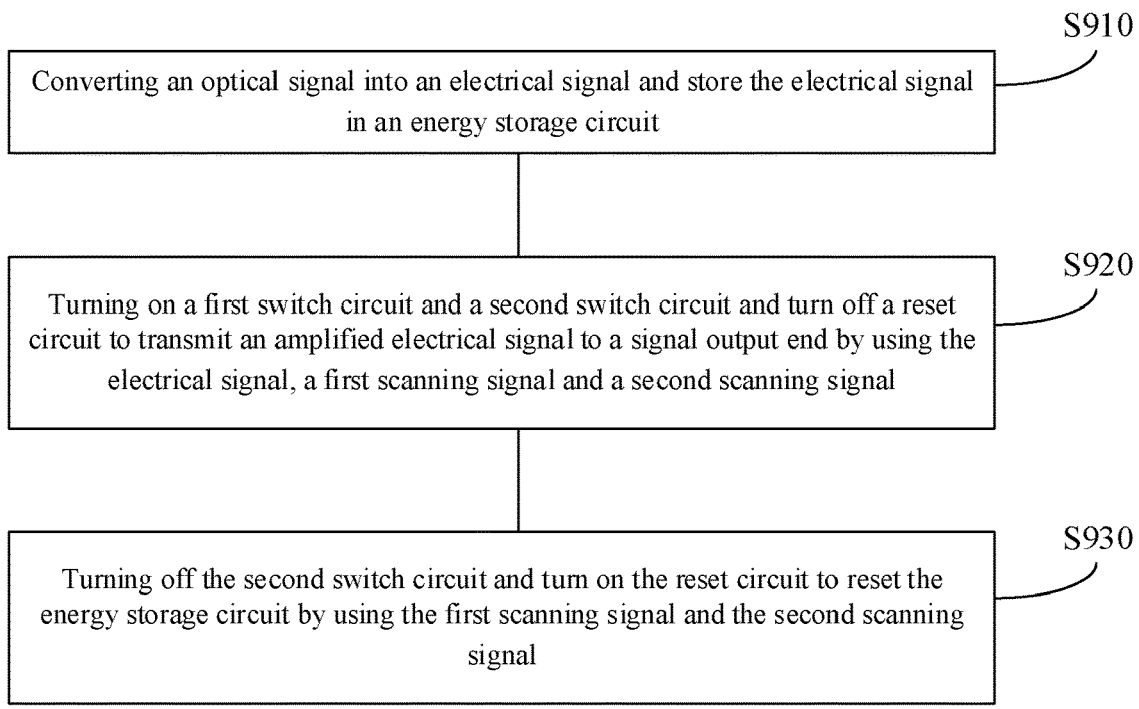
FIG. 9 is a flowchart of a control method of a first pixel sensor provided by an exemplary embodiment of the present disclosure.

An exemplary embodiment of the present disclosure further provides a method for controlling a pixel sensor. As shown in FIG. 9, the method includes the following steps:

Step S910, converting an optical signal into an electrical signal and storing the electrical signal in an energy storage circuit.

Step S920, turning on a first switch circuit and a second switch circuit and turning off a reset circuit to transmit the amplified electrical signal to a signal output end by using the electrical signal, a first scanning signal and a second scanning signal.

Step S930, turning off the second switch circuit and turning on the reset circuit to reset the energy storage circuit by using the first scanning signal and the second scanning signal.

According to the method for controlling the pixel sensor provided in the embodiment of the present disclosure, the optical signal is converted into the electrical signal by the photoelectric conversion circuit 110, and the electrical signal is stored in the energy storage circuit 120, a first power signal Vdd is transmitted to a signal output end through a first switch circuit 140 and a second switch circuit 150 by using the electrical signal and a first scanning signal Gn−1 to realize amplification of the electrical signal output by the photoelectric conversion circuit 110. The energy storage capacitor 120 is reset by a second scanning signal Gn, and a scanning signal of next line is multiplexed to reset the pixel sensor, thereby reducing a number of signals and signal lines in the pixel sensor, simplifying control of the pixel sensor and helping to save wiring space of the pixel sensor.

In step S910, the optical signal may be converted into the electrical signal and stored in the energy storage circuit 120.

During the photoelectric conversion process, the first scanning signal Gn–1 is low level and the second transistor T2 is turned off; the second scanning signal Gn is low level and the third transistor T3 is turned off; the photodiode PD receives the optical signal and converts the optical signal into the electrical signal Sig and stores the electrical signal Sig in the energy storage capacitor Cst.

In step S920, the electrical signal, the first scanning signal Gn–1, and the second scanning signal Gn may be used to turn on the first switch circuit 140 and the second switch circuit 150, and turn off the reset circuit 130, so that the amplified electrical signal is transmitted to the signal output end.

The first scanning signal Gn–1 is high and the second transistor T2 is on; the second scanning signal Gn is low level and the third transistor T3 is turned off; the first transistor T1 is turned on under the driving of the signal in the energy storage capacitor Cst, and the signal of the first power supply Vdd is transmitted to the signal output end through the first transistor T1 and the second transistor T2, that is, the amplified electrical signal is transmitted to the signal output end.

In step S930, the first scanning signal Gn–1 and the second scanning signal Gn may be used to turn off the second switch circuit 150 and turn on the reset circuit 130 to apply energy to reset the energy storage circuit 120.

The first scanning signal Gn–1 is low level and the second transistor T2 is turned off; the second scanning signal Gn is high level and the third transistor T3 is turned on; the first power supply Vdd and the second power supply Vbias are respectively loaded at both ends of the energy storage capacitor Cst, and the energy storage capacitor Cst is reset.

It should be noted that although the steps of the method in the present disclosure are described in a specific order in the drawings, this does not require or imply that the steps must be performed in the specific order, or all steps shown must be performed to achieve desired results. Additionally or alternatively, certain steps may be omitted, multiple steps may be combined into one step for execution, and/or one step may be split into multiple steps for execution, and so on.

An exemplary embodiment of the present disclosure also provides a detector including the above-mentioned pixel sensor.

Figure 10:
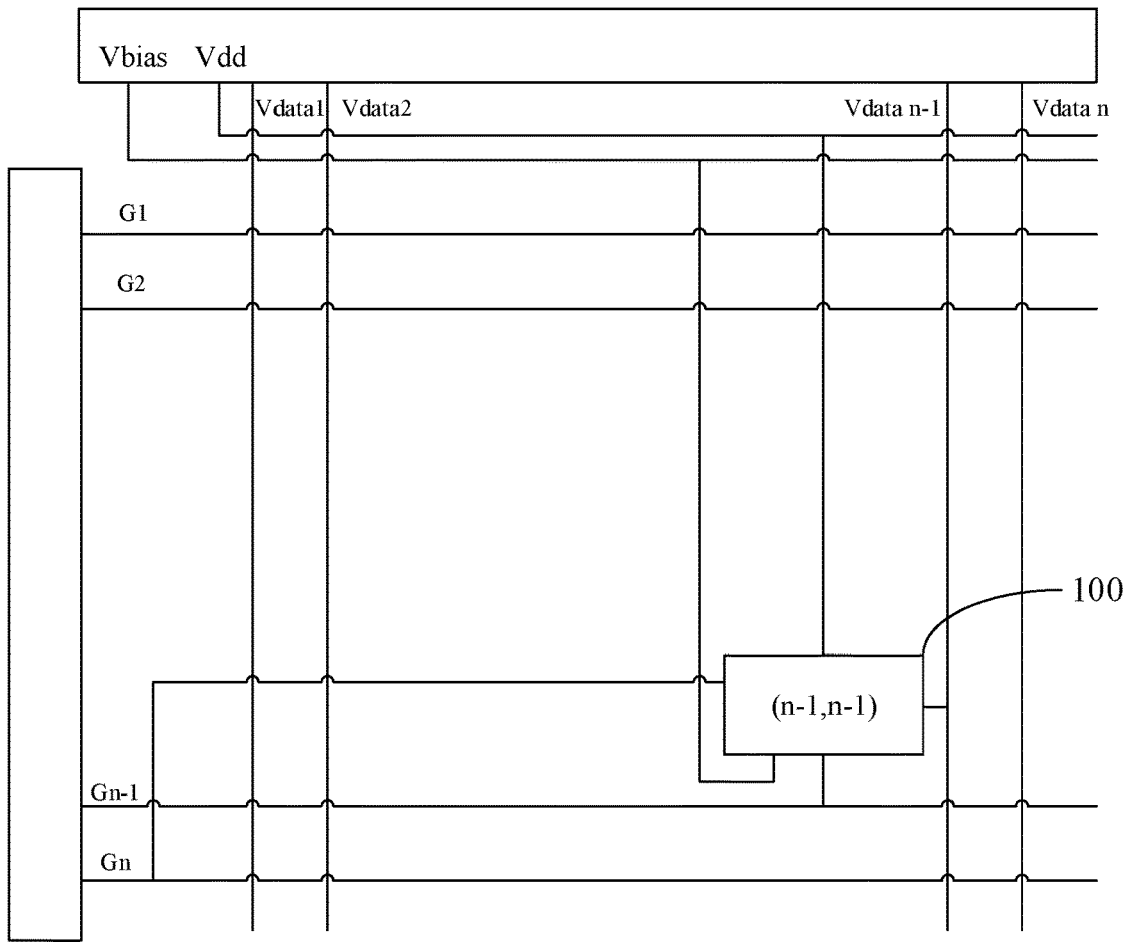
FIG. 10 is a schematic diagram of a first detector provided by an exemplary embodiment of the present disclosure.

As shown in FIG. 10, the pixel sensors 100 are distributed in an array on the detector. In the above embodiment, the pixel sensors in the n–1th row and the n–1th column in the array are used as an example for description (n≥2). The distribution manner of the pixel sensors 100 on the detector may be the same as the pixel arrangement manner of the corresponding display device. The pixel sensor detects the X-ray transmission at the current pixel, and converts the X-ray transmission, that is, the visible light converted by the scintillator, into an electrical signal through the photoelectric conversion circuit 110. The electrical signal is amplified by the pixel sensor and output as a data signal Vdata of a pixel driving circuit of the display device.

Figure 11:
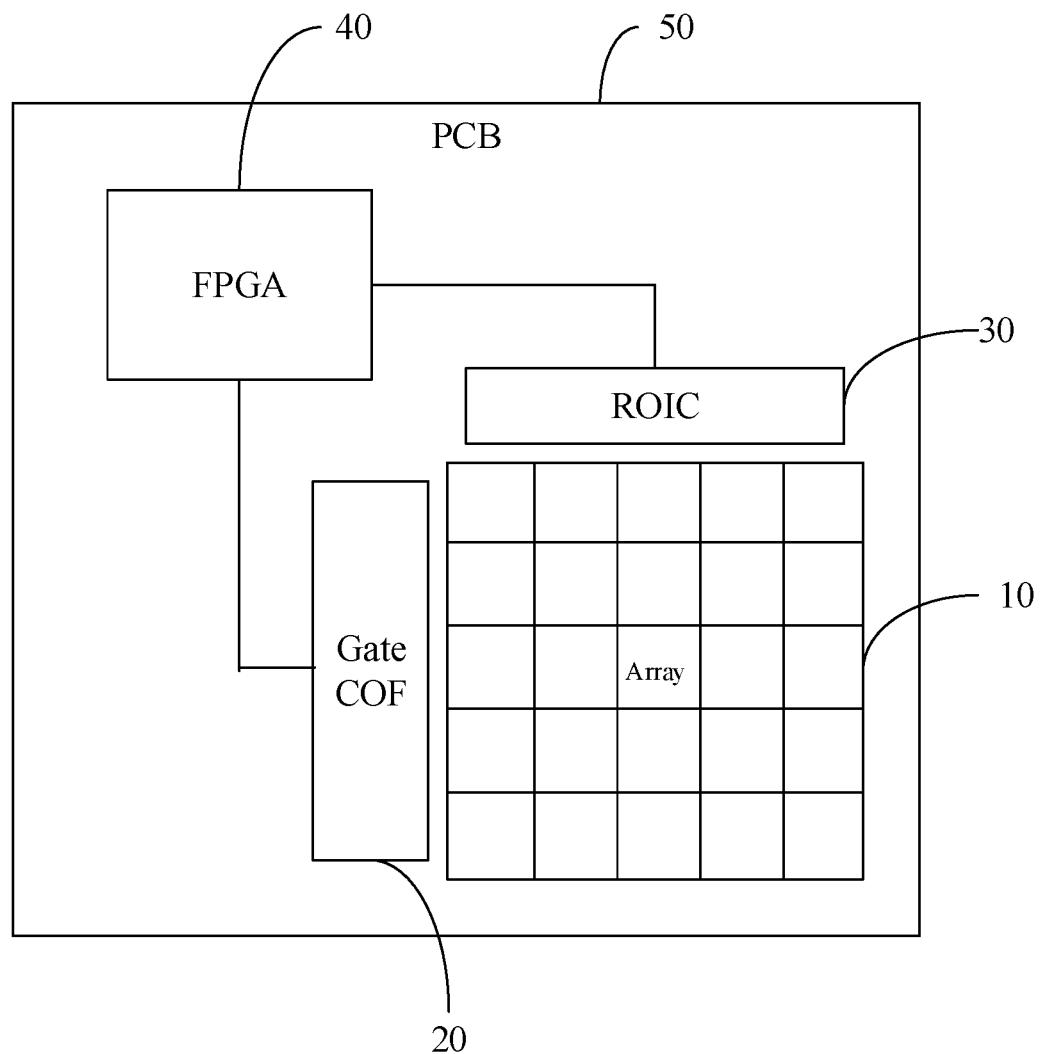
FIG. 11 is a schematic diagram of a second detector provided by an exemplary embodiment of the present disclosure.

For example, as shown in FIG. 11, the detector provided in the embodiment of the present disclosure is an X-ray flat-panel detector. The detector inputs scanning signals to the pixel sensor array 10 row by row through a gate driving circuit 20 in the row direction. The gate driving circuit 20 is connected to a controller 40, and the scanning signal can be controlled by the controller 40. The data signal Vdata at the output end of the pixel sensor array 10 is transmitted to an output circuit 30 in the column direction, and the output circuit 30 is connected to the controller 40. The controller 40 may be an FPGA (Field Programmable Gate Array). The pixel sensor array 10, the gate driving circuit 20, the output circuit 30 and the controller 40 can all be provided on a circuit board 50.

The detector provided in the embodiment of the present disclosure includes the above-mentioned pixel sensor. The optical signal is converted into an electrical signal by the photoelectric conversion circuit 110, and the electrical signal is stored in the energy storage capacitor Cst. The signal of the first power supply Vdd is transmitted to the signal output end through the first switch circuit 140 and the second switch circuit 150 by using the electrical signal and the first scanning signal Gn–1, so as to amplify the electrical signal output by the photoelectric conversion circuit 110. The energy storage circuit 120 is reset by the second scanning signal Gn, and the scanning signal of the next line is multiplexed to reset the pixel sensor, which reduces the number of signals and signal lines in the pixel sensor, simplifies the control of the pixel sensor, and is beneficial to saving wiring space of the pixel sensor. In addition, the reset circuit is controlled by the second scanning signal Gn, so that the detector can be reset line by line, reducing the current during reset, and reducing the ripple impact of excessive current on the first power supply during reset.

The pixel sensor provided in the embodiment of the present disclosure converts an optical signal into an electrical signal through a photoelectric conversion circuit, stores the electrical signal in an energy storage capacitor, and transmits a first power signal to a signal output end through a first switch circuit and a second switch circuit by using the electrical signal and a first scanning signal to realize amplification of the electrical signal output by the photoelectric conversion circuit. The energy storage capacitor is reset by a second scanning signal, and a scanning signal of next line is multiplexed to reset the pixel sensor, thereby reducing a number of signals and signal lines in the pixel sensor, simplifying control of the pixel sensor and helping to save wiring space of the pixel sensor.

Those skilled in the art will readily contemplate other embodiments of the present disclosure after considering the specification and practicing the invention disclosed herein. This application is intended to cover any variations, uses, or adaptations of this disclosure that conform to the general principles of this disclosure and include the common general knowledge or conventional technical means in the technical field not disclosed by this disclosure. It is intended that the specification and examples be considered as exemplary only, with a true scope and spirit of the disclosure being indicated by the following claims.

It should be understood that the present disclosure is not limited to the precise structure that has been described above and illustrated in the accompanying drawings, and various modifications and changes may be made without departing from the scope thereof. The scope of the disclosure is limited only by the following claims.

What is claimed is:
1. A pixel sensor, comprising:
   a photoelectric conversion circuit, configured to convert an optical signal into an electrical signal;
   an energy storage circuit, having a first end connected to a first end of the photoelectric conversion circuit, and a second end connected to a second end of the photoelectric conversion circuit, wherein the second end of the photoelectric conversion circuit is further connected to a second power supply end;

a reset circuit, having a first end connected to a first power supply end, a second end connected to the photoelectric conversion circuit, and a control end connected to a second scanning signal end, and the reset circuit being configured to be turned on in response to a second scanning signal of the second scanning signal end to transmit a first power signal to the first end of the energy storage circuit;

a first switch circuit, having a first end connected to the first power supply end, a second end connected to a first node, and a control end connected to the first end of the energy storage circuit, and the first switch circuit being configured to be turned on in response to a signal stored in the energy storage circuit to transmit the first power signal to the first node;

a second switch circuit, having a first end connected to the first node, a second end connected to a signal output end, and a control end connected to a first scanning signal end, and the second switch circuit being configured to be turned on in response to a first scanning signal of the first scanning signal end to transmit a signal at the first node to the signal output end.

2. The pixel sensor according to claim 1, wherein, the pixel sensor further comprises:
a first delay circuit, provided between the second scanning signal end and the control end of the reset circuit, and configured to delay turn-off of the reset circuit.

3. The pixel sensor according to claim 2, wherein, the first delay circuit comprises:
a first resistance-capacitance circuit, wherein the first resistance-capacitance circuit is respectively connected to the second scanning signal end, the control end of the reset circuit, and a third power supply end.

4. The pixel sensor according to claim 2, wherein, the first delay circuit comprises:
a first diode, having a first end connected to the second scanning signal end, and a second end connected to the control end of the reset circuit;
a second diode, having a first end connected to the control end of the reset circuit, and a second end connected to the second scanning signal end.

5. The pixel sensor according to claim 1, wherein, the pixel sensor further comprises:
a second delay circuit, wherein the second delay circuit is provided between the first power supply end and the first end of the reset circuit.

6. The pixel sensor according to claim 5, wherein, the second delay circuit comprises:
a second resistance-capacitance circuit, wherein the second resistance-capacitance circuit is connected to the first power supply end, the first end of the reset circuit, and a third power supply end, respectively.

7. The pixel sensor according to claim 1, wherein, the first switch circuit comprises:
a first transistor, having a first end connected to the first power supply end, a second end connected to the first node and a control end connected to the first end of the energy storage circuit, and the first transistor being configured to be turned on in response to the signal stored in the energy storage circuit to transmit the first power signal to the first node.

8. The pixel sensor according to claim 1, wherein, the second switch circuit comprises:
a second transistor, having a first end connected to the first node, a second end connected to the signal output end, and a control end connected to the first scanning signal end, and the second transistor being configured to be turned on in response to the first scanning signal to transmit the signal at the first node to the signal output end.

9. The pixel sensor according to claim 1, wherein, the photoelectric conversion circuit comprises:
a photodiode, having a first end connected to the control end of the first switch circuit and a second end connected to the second power supply end.

10. The pixel sensor according to claim 1, wherein, the reset circuit comprises:
a third transistor, having a first end connected to the photoelectric conversion circuit, a second end connected to the first power supply end, and a control end connected to the second scanning signal end, and the third transistor being configured to be turned on in response to the second scanning signal to transmit the first power signal to the first end of the energy storage circuit.

11. The pixel sensor according to claim 1, wherein:
the first switch circuit comprises: a first transistor, having a first end connected to the first power supply end, a second end connected to the first node and a control end connected to the first end of the energy storage circuit, and the first transistor being configured to be turned on in response to the signal stored in the energy storage circuit to transmit the first power signal to the first node,
wherein the second switch circuit comprises: a second transistor, having a first end connected to the first node, a second end connected to the signal output end, and a control end connected to the first scanning signal end, and the second transistor being configured to be turned on in response to the first scanning signal to transmit the signal at the first node to the signal output end,
wherein the photoelectric conversion circuit comprises: a photodiode, having a first end connected to the control end of the first switch circuit and a second end connected to the second power supply end, and
the reset circuit comprises: a third transistor, having a first end connected to the photoelectric conversion circuit, a second end connected to the first power supply end, and a control end connected to the second scanning signal end, and the third transistor being configured to be turned on in response to the second scanning signal to transmit the first power signal to the first end of the energy storage circuit.

12. A method for controlling the pixel sensor according to claim 1, comprises:
converting the optical signal into the electrical signal and storing the electrical signal in the energy storage circuit;
turning on the first switch circuit and the second switch circuit and turning off the reset circuit to transmit an amplified electrical signal to the signal output end, by using the electrical signal, the first scanning signal, and the second scanning signal;
turning off the second switch circuit and turning on the reset circuit to reset the energy storage circuit by using the first scanning signal and the second scanning signal.

13. A detector, comprising:
a pixel sensor, configured to detect an optical signal, wherein the pixel sensor comprises:
a photoelectric conversion circuit, configured to convert the optical signal into an electrical signal;
an energy storage circuit, having a first end connected to a first end of the photoelectric conversion circuit, and a second end connected to a second end of the photoelectric conversion circuit, wherein the second end of the photoelectric conversion circuit is further connected to a second power supply end;

a reset circuit, having a first end connected to a first power supply end, a second end connected to the photoelectric conversion circuit, and a control end connected to a second scanning signal end, and the reset circuit being configured to be turned on in response to a second scanning signal of the second scanning signal end to transmit a first power signal to the first end of the energy storage circuit;

a first switch circuit, having a first end connected to the first power supply end, a second end connected to a first node, and a control end connected to the first end of the energy storage circuit, and the first switch circuit being configured to be turned on in response to a signal stored in the energy storage circuit to transmit the first power signal to the first node;

a second switch circuit, having a first end connected to the first node, a second end connected to a signal output end, and a control end connected to a first scanning signal end, and the second switch circuit being configured to be turned on in response to a first scanning signal of the first scanning signal end to transmit a signal at the first node to the signal output end.

14. The detector according to claim 13, wherein, the pixel sensor further comprises:

a first delay circuit, provided between the second scanning signal end and the control end of the reset circuit, and configured to delay turn-off of the reset circuit.

15. The detector according to claim 14, wherein, the first delay circuit comprises:

a first resistance-capacitance circuit, wherein the first resistance-capacitance circuit is respectively connected to the second scanning signal end, the control end of the reset circuit, and a third power supply end.

16. The detector according to claim 14, wherein, the first delay circuit comprises:

a first diode, having a first end connected to the second scanning signal end, and a second end connected to the control end of the reset circuit;

a second diode, having a first end connected to the control end of the reset circuit, and a second end connected to the second scanning signal end.

17. The detector according to claim 13, wherein, the pixel sensor further comprises:

a second delay circuit, wherein the second delay circuit is provided between the first power supply end and the first end of the reset circuit.

18. The detector according to claim 17, wherein, the second delay circuit comprises:

a second resistance-capacitance circuit, wherein the second resistance-capacitance circuit is connected to the first power supply end, the first end of the reset circuit, and a third power supply end, respectively.

19. The detector according to claim 13, wherein, the first switch circuit comprises:

a first transistor, having a first end connected to the first power supply end, a second end connected to the first node and a control end connected to the first end of the energy storage circuit, and the first transistor being configured to be turned on in response to the signal stored in the energy storage circuit to transmit the first power signal to the first node.

20. The detector according to claim 13, wherein, the second switch circuit comprises:

a second transistor, having a first end connected to the first node, a second end connected to the signal output end, and a control end connected to the first scanning signal end, and the second transistor being configured to be turned on in response to the first scanning signal to transmit the signal at the first node to the signal output end.

* * * * *